United States Patent [19]
Johnson

[11] 4,088,365
[45] May 9, 1978

[54] PORTABLE STORAGE APPARATUS AND METHODS OF CONSTRUCTING AND UTILIZING SAME

[76] Inventor: Donald J. Johnson, 28448 Cherry, Box 361, Romulus, Mich. 48174

[21] Appl. No.: 677,050

[22] Filed: Apr. 14, 1976

[51] Int. Cl.² .............................................. B60R 7/00
[52] U.S. Cl. ............... 296/37.6; 224/42.1 C; 248/356; 312/255
[58] Field of Search ............... 296/24 R, 37 R, 37.1, 296/37.6, 37.8; 224/42.1 C, 42.1 CA, 42.42 R, 42.45 R, 42.45 A; 312/255, 256, 245, 247, 198; 248/356, 359

[56] References Cited

U.S. PATENT DOCUMENTS

| | | | |
|---|---|---|---|
| 2,632,587 | 3/1953 | Pugel | 224/42.1 C |
| 2,991,040 | 7/1961 | Levy | 312/256 |
| 3,000,664 | 9/1961 | Martin | 296/26 |
| 3,323,851 | 6/1967 | Duboff | 312/255 |
| 3,401,652 | 9/1968 | Thor | 248/356 |
| 3,450,454 | 6/1969 | Anders | 312/198 |

Primary Examiner—Joseph F. Peters, Jr.
Assistant Examiner—John A. Carroll
Attorney, Agent, or Firm—Irving M. Weiner; Pamela S. Austin

[57] ABSTRACT

A portable storage apparatus is provided for use in connection with foldable camping trailers. The apparatus is suitable for mounting in an eye level or overhead position between a counter top and the ceiling of the trailer and can be adapted to conform to various trailer dimensions. The apparatus can be removed from the eye level or overhead position for use in portable applications or for positioning on any suitable surface.

7 Claims, 4 Drawing Figures

U.S. Patent  May 9, 1978  4,088,365
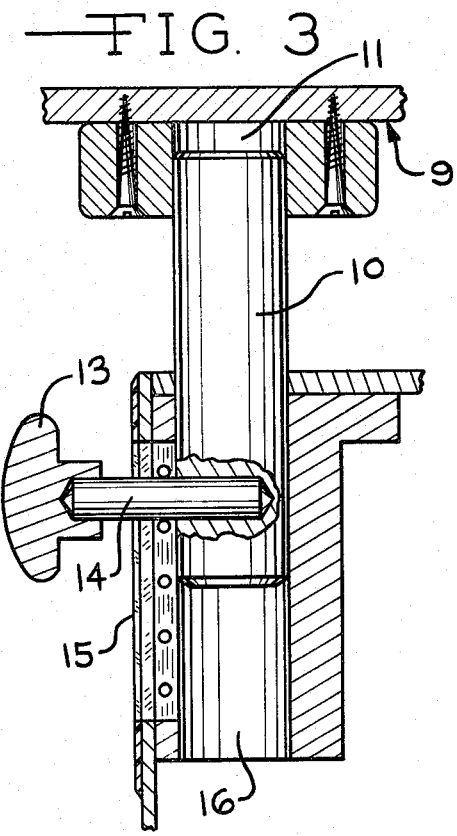
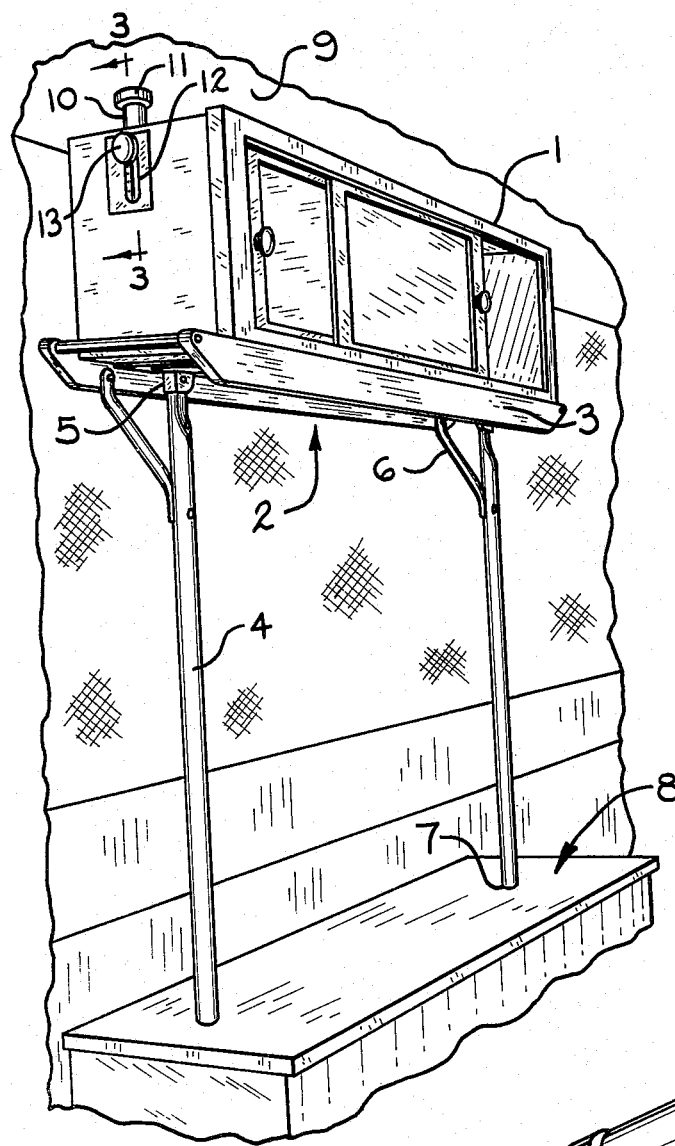
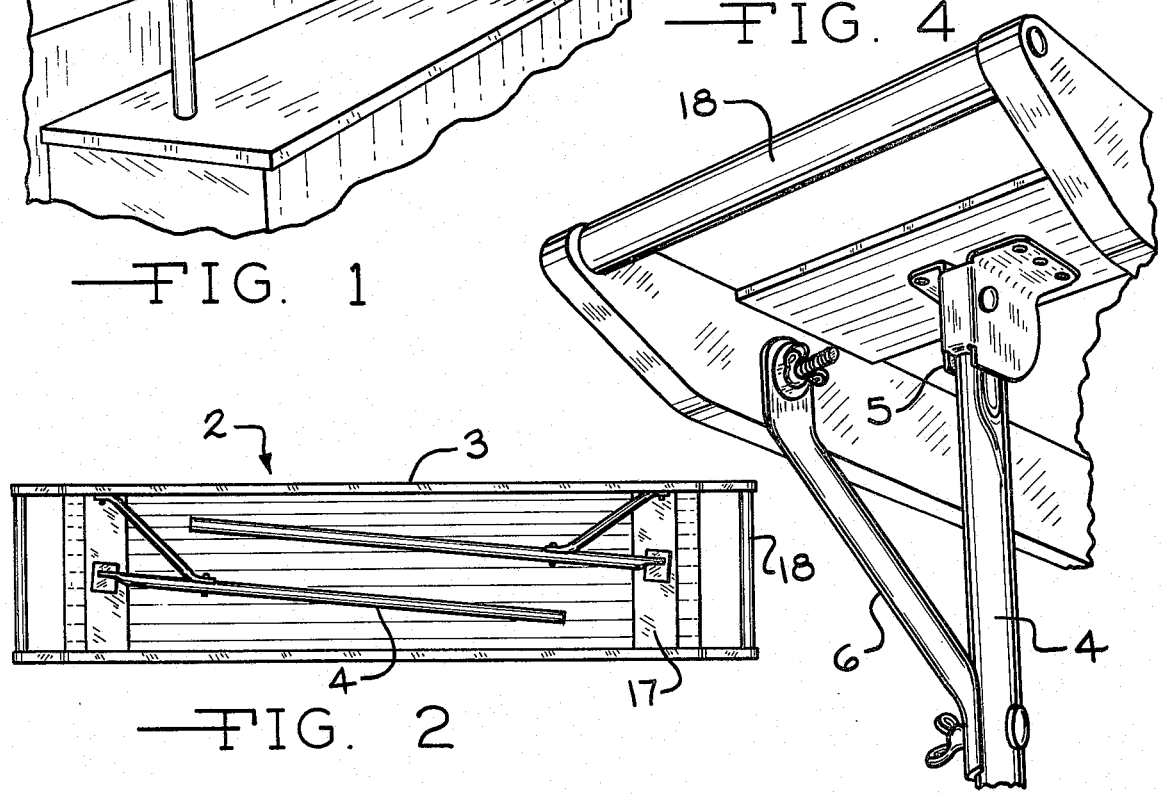

PORTABLE STORAGE APPARATUS AND METHODS OF CONSTRUCTING AND UTILIZING SAME

BACKGROUND OF THE INVENTION

1. Field of the Invention

The present invention relates generally to a portable storage apparatus for use in a foldable camping trailer. The general type of foldable trailer which is particularly alluded to herein is the type consisting of a main rectangular lower body portion to which is connected a rigid rectangular cover which serves as a hard top for the trailer when the trailer is extended to full height. A flexible material such as canvas connects the lower body of the trailer to the rigid cover so that the cover can be moved from a collapsed low-profile position to an extended full-height position. The apparatus is also designed for use in a wide range of other recreational vehicles.

2. Description of the Prior Art

Camping trailers of the foldable type have become increasingly popular for use by campers due to the low-profile nature of such trailers in their retracted positions. There has thus developed a widespread and long felt need for a storage device which provides convenience in installation and ample storage room. Heretofore, however, there has not been developed any storage facilities for foldable trailers which afford abundant storage space for campers. Indeed, since most prior art devices in this field have been of a permanently affixed or retractable nature, the dimensions of such storage devices have been restricted to the limited space available between the upper surfaces of the components of the lower body portion and the trailer top when the trailer is retracted into its low-profile position.

Some of the prior art devices which exemplify permanently affixed or retractable storage facilities are those found in U.S. Pat. No. 3,288,521 issued in 1966 to Patnode; U.S. Pat. No. 3,392,966 issued in 1966 to Mariol; U.S. Pat. No. 3,347,591 issued in 1967 to Soroos; U.S. Pat. No. 3,456,979 issued in 1969 to Hunter; U.S. Pat. No. 3,558,179 issued in 1971 to Sonet; U.S. Pat. No. 3,635,516 issued in 1972 to Commans; and U.S. Pat. No. 3,838,880 issued in 1974 to Lefebvre. Generally, such prior art storage units have been of the type which are secured to a side wall of the trailer and which swing from a storage position in the collapsed trailer to an operating position when the trailer is extended to its full-height position. Such devices have also suffered the disadvantages of being too cumbersome to be easily positioned and too unstable to provide effective storage space.

The present invention eliminates the disadvantages attendant the conventional prior art devices and at the same time provides a storage device which is convenient to use, inexpensive to manufacture, and adaptable to a wide range of trailer dimensions.

SUMMARY OF THE INVENTION

The present invention provides a portable storage apparatus including a box-shaped main body portion and elongated substantially vertical support members secured at the upper ends thereof to suitable mounting means for supporting the main body portion and at the lower ends thereof to a fixed external structure.

It is an object of the present invention to provide a novel portable storage apparatus for use in a foldable camping trailer which is provided with a standard counter top.

In accordance with a preferred embodiment of the present invention, there is provided a portable storage apparatus which is mounted on a frame platform. The frame platform member includes two longitudinal side rails joined by a plurality of cross members and elevated above the trailer counter top by means of a plurality of elongated vertical support members which are secured by suitable means at their lower ends to the counter top. In addition, the apparatus may include latch means for securing the main body portion to the ceiling of the trailer to provide horizontal support therefor.

Another object of the invention is to provide a larger storage facility than is available with a permanently attached foldable trailer storage facility.

Yet another object of the invention is to provide a storage apparatus for foldable trailers which eliminates vertical loads from being placed on either the trailer roof or the supporting structure connecting the roof with the lower trailer body.

Other objects and details of the invention will become apparent from the following description, when read in conjunction with the accompanying drawings.

BRIEF DESCRIPTION OF THE DRAWINGS

FIG. 1 illustrates a perspective view of a preferred embodiment of the present invention which is shown positioned in a camping trailer.

FIG. 2 depicts a bottom elevational view of the frame platform member in storage position.

FIG. 3 illustrates a sectional view taken along the line 3—3 of FIG. 1.

FIG. 4 depicts a perspective view of the bottom end of the FIG. 1 frame platform member.

DETAILED DESCRIPTION OF PREFERRED EMBODIMENTS

With reference to FIG. 1, there is shown a first embodiment of the present invention including a rectangular box-shaped main body portion 1. The box 1 shown with sliding doors provided therein, however, any suitable enclosure means, such as doors or drawers, may or may not be provided. The box 1 is preferably constructed of wood, plastic, sheetmetal, or any other suitable resilient material. The box 1 is shown with the substantially horizontal bottom wall thereof mounted on a frame platform depicted generally as 2. The platform 2 is constructed of two longitudinal side rails 3 which are of sufficient depth to provide stable support for the box 1. The side rails 3 are joined together by cross members 17 which are shown more clearly in FIG. 2. The vertical support members 4 provide vertical support for the apparatus in its mounted position. Preferably, the vertical support members 4 are hingedly affixed to the platform 2 at their upper ends as depicted at 5. Thus, the vertical support members 4 can be folded up in storage position against the platform 2 as shown in FIG. 2. Tubular struts 6 are secured at one end to the vertical support members 4 and pivot at the side rails 3 so as to form a truss and thereby reduce any relative wobbling between the platform 2 and the vertical support members 4 to an undetectable level. This arrangement is shown in FIG. 4.

The vertical support members 4 are secured at their lower ends 7 to the counter top 8 by any suitable means. Such means may include, for example, an anti-skid surface provided on the end 7 of the vertical support member 4 to frictionally engage with the couner top 8 and prevent slipping of the vertical support members 4. Alternatively, the counter top 8 may be provided with a receiving aperture into which the end 7 may be inserted for stabilization of the vertical support member 4 with respect to the counter top 8.

Horizontal support for the box 1 is provided by means of securing same to the external ceiling structure 9 by way of any suitable latching means. The latching means of FIG. 1 (shown more clearly in FIG. 3) includes a dowel 10 which is slidably fitted into the receiving aperture 11 provided in the trailer ceiling. The dowel 10 slides within a cavity 16 provided in the box 1. A threaded stud 14 is secured to dowel 10 (see FIG. 3) and is inserted through a vertical slot in the box 1 for varying the height of the dowel 10. A knob 13 threads onto the outside end of the stud 14 which can slide vertically in the slot 12 to control the height of the dowel 10. The dowel 10 is held in its desired position by tightening the knob 13 against the surface 15 and thereby holding dowel 10 in a stationary position. Thus, by selectively raising or lowering the position of the dowel 10, the storage apparatus is adaptable to conform to the varying counter-to-ceiling height dimensions of various sizes and types of trailers. Also, changes in ceiling height due to thermal expansion or contraction can be adjusted to by adjusting the height of dowel 10.

Optionally, a dowel cross member 18 can be affixed between the side rails 3 at the ends thereof as shown in FIG. 4. The dowels 18 serve as convenient towel racks when the apparatus is mounted for use. Also, hooks (not shown) can be provided along the outwardly-facing surfaces of the side rails 3 for conveniently handing utensils thereon.

FIG. 2 shows the platform 2 in its folded storage position. The side rails 3 serve to protect the folded vertical support members 4 from damage, while the end cross dowels 18 serve as handles for the platform 2.

In erecting the apparatus as above described, the apparatus is held above the counter top 8 and the vertical support members 4 are folded down into contact with the counter top 8. Next, the dowel 10 is positioned in the ceiling aperture 11 and tightened in place by turning knob 13. In this manner, vertical loads from the storage apparatus are transmitted through vertical support members 4 to the counter top 8. Horizontal loads, which would be minimal, are transmitted to the trailer ceiling 9 by way of the dowel 10. It is estimated that total normal set-up and take-down time for this embodiment takes from 15 to 20 seconds.

In an alternate embodiment of the invention, the vertical support members 4 are provided with supporting plates with flanged edges at their upper ends (not shown). The plates serve to support the box 1 in an elevated eye level or overhead position, without the need for platform 2. The lower ends of the vertical support members 4 are threaded or tapered and the counter top 8 is provided with threaded or tapered receiving flanges for securing the vertical support members 4 in position thereon. In erecting this embodiment, the vertical support members 4 are screwed or inserted into the counter top flanges and the box 1 lifted up and rested on the supporting plates. Horizontal support means similar to the dowel 10 arrangement of FIG. 1 is also provided.

In a third embodiment of the invention, the folding vertical support members 4 can be secured directly to the lower surface of box 1, eliminating the necessity of platform 2 of FIG. 1. This embodiment is conducive to the same variations as described above with respect to the FIG. 1 embodiment.

In yet another embodiment of the invention, the lower surface of box 1 is provided with downwardly-projecting carriage bolts (not shown). Preferably, the lower surface of the box 1 is provided with four apertures through which the carriage bolts are inserted. Also, the platform 2 is provided with four receiving apertures through which the carriage bolts are passed. Threaded knobs or tip ends are secured to the carriage bolts from beneath the platform 2 to secure the box 1 firmly to the platform 2. The carriage bolts serve the additional function of acting as legs for the box 1 when box 1 is in an unmounted position. The knobs or tip ends are replaced on the carriage bolts after dismounting of the box 1 to protect underlying surfaces from damage by the carriage bolt ends. In this manner, box 1 can serve as a storage apparatus on any suitable desired surface. Also, the carriage bolts can serve in securing the box 1 to any vertical surface by means of supporting brackets provided on the vertical surface and adapted to receive the carriage bolts for securement of the box 1 thereto.

It is further contemplated that box 1 can be provided with a carrying handle on the upper surface thereof to provide easy transportability of the box 1 by a single person.

It should be noted that the box 1 is not restricted to being supported by only two vertical support members 4 as shown in the drawings. For example, the apparatus can be provided with four vertical support members, thus eliminating the need for horizontal support means or ceiling securement.

It will be obvious from the foregoing disclosure that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description. Furthermore, all changes which come within the meaning and range of equivalency of the appended claims are therefore intended to be embraced therein.

I claim:

1. A portable storage apparatus comprising:
   a box-shaped main body portion;
   elongated substantially vertical support members secured at the upper ends thereof to suitable mounting means for supporting said main body portion and at the lower ends thereof to a fixed external structure;
   said fixed external structure comprising a permanently disposed suitable horizontal surface;
   said mounting means comprising a frame platform member including two longitudinal side rails joined by a plurality of cross members;
   said main body portion is removably mounted on said frame platform member;
   latch means are provided near the top edge of said main body portion for securing to an external ceiling structure;
   said ceiling structure is provided with apertures for receiving said latch means to provide horizontal support for said apparatus;
   said vertical support members are hingedly secured at the upper ends thereof to the bottom surface of said frame platform member to permit said vertical support members to be folded up adjacent said frame platform member for storage purposes;

said vertical support members having secured thereto at the upper ends thereof a strut which is in turn secured to said frame platform member, thereby forming a truss to reduce relative movement between said frame platform member and said vertical support members;

at least one side rail of said frame platform member is provided with a plurality of hooks for conveniently hanging utensils thereon; and said plurality of cross members includes a dowel cross member disposed at each end of said frame platform member.

2. A portable storage apparatus comprising:
a box-shaped main body portion defined by a top wall, side walls, and a substantially horizontal bottom wall;

elongated substantially vertical support members secured at the upper ends thereof to suitable mounting means for supporting said main body portion adjacent said bottom wall thereof and at the lower ends thereof to a fixed external structure;

said fixed external structure comprising a permanently disposed suitable horizontal surface;

said vertical support members comprising a plurality of vertical support members having the lower ends thereof threaded;

suitable threaded flanges provided in said suitable horizontal surface to receive said threaded lower ends of said vertical support members;

said mounting means including supporting plates with flanged edges to support said main body portion adjacent said bottom wall of said main body portion;

latch means provided near the top edge of said main body portion for securing to an external ceiling structure; and said ceiling structure being provided with apertures for receiving said latch means to provide horizontal support for said apparatus.

3. A portable storage apparatus comprising:
a box-shaped main body portion;

elongated substantially vertical support members secured at the upper ends thereof to suitable mounting means for supporting said main body portion and at the lower ends thereof to a fixed external structure;

said fixed external structure comprising a permanently disposed suitable horizontal surface;

said vertical support members comprise a plurality of support members hingedly secured at the upper ends thereof to the bottom surface of said main body portion to permit said vertical support members to be folded up adjacent said main body portion for storage purposes;

flanges being provided in said suitable horizontal surface to receive the lower ends of said vertical support members;

latch means are provided near the top edge of said main body member for securing to an external ceiling structure; and said ceiling structure is provided with apertures for receiving said latch means to provide horizontal support for said apparatus.

4. An apparatus substantially in accordance with claim 3, wherein:

said suitable horizontal surface comprises the horizontal surface of a counter top permanently disposed within a foldable camping trailer; and said external ceiling structure comprises the ceiling of said foldable camping trailer.

5. A portable storage apparatus comprising:
a box-shaped main body portion;

elongated substantially vertical support members secured at the upper ends thereof to suitable mounting means for supporting said main body portion and at the lower ends thereof to a fixed external structure;

said fixed external structure comprising a permanently disposed suitable horizontal surface;

said vertical support members comprise a plurality of support members hingedly secured at the upper ends thereof to the bottom surface of said main body portion to permit said vertical support members to be folded up adjacent said main body portion for storage purposes;

the lower ends of said vertical support members are provided with anti-skid means to provide frictional securement of said lower ends to the surface of said suitable horizontal surface;

latch means are provided near the top edge of said main body member for securing to an external ceiling structure; and said ceiling structure is provided with apertures for receiving said latch means to provide horizontal support for said apparatus.

6. A portable storage apparatus comprising:
a box-shaped main body portion;

elongated substantially vertical support members secured at the upper ends thereof to suitable mounting means for supporting said main body portion and at the lower ends thereof to a fixed external structure;

said fixed external structure comprising a permanently disposed suitable horizontal surface;

said mounting means comprises a frame platform member including two longitudinal side rails joined by a plurality of cross members;

said main body portion is removably mounted on said frame platform member;

latch means are provided near the top edge of said main body portion for securing to an external ceiling structure;

said ceiling structure is provided with apertures for receiving said latch means to provide horizontal support for said apparatus;

said main body portion is provided with a carrying handle; the bottom surface of said main body portion is provided with a plurality of downwardly protruding carriage bolts;

said frame platform member is provdied with apertures for receiving siad plurality of carriage bolts when said main body portion is mounted thereon; and threaded tips are provided for attachment to said carriage bolts to provide securement of said main body portion to said frame platform member when said main body portion is in a mounted position, and to provide protective covering of said carriage bolts when said main body portion is in a dismounted position on any suitable surface.

7. A portable storage apparatus comprising:
a box-shaped main body portion; elongated substantially vertical support members secured at the upper ends thereof to suitable mounting means for supporting said main body portion and at the lower ends thereof to a fixed external structure;

said fixed external structure comprising a permanently disposed suitable horizontal surface;

said mounting means comprises a frame platform member including two longitudinal side rails joined by a plurality of cross members;

said main body portion is removably mounted on said frame platform member;

latch means are provided near the top edge of said main body portion for securing to an external ceiling structure;

said ceiling structure is provided with apertures for receiving said latch means to provide horizontal support for said apparatus;

said vertical support members comprise four support members secured at the upper ends thereof to the bottom surface of said frame platform member to permit said vertical support members to be folded up adjacent said frame platform member for storage purposes;

the bottom surface of said main body portion is provided with a plurality of downwardly protruding carriage bolts; and said main body portion is secured to an external wall structure provided with suitable wall mounting means for receiving said carriage bolts.

* * * * *